July 11, 1961 C. G. PETERSON 2,991,963
AIRCRAFT CONTROL COLUMN
Filed July 3, 1958 4 Sheets-Sheet 1
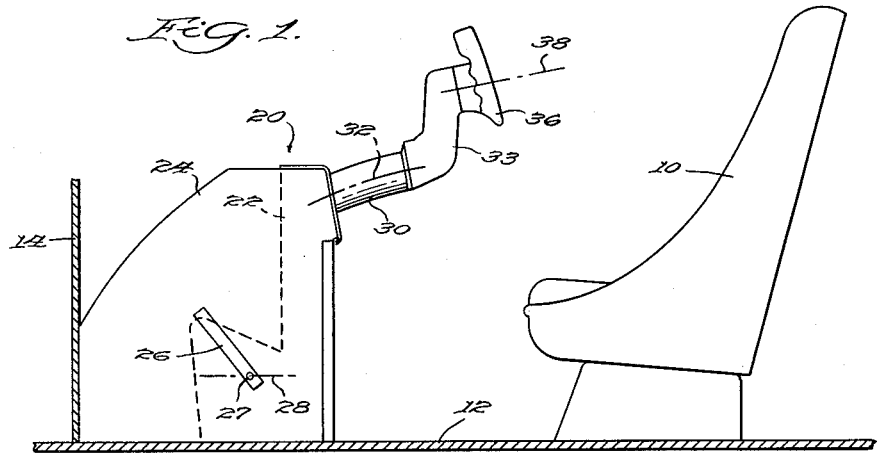
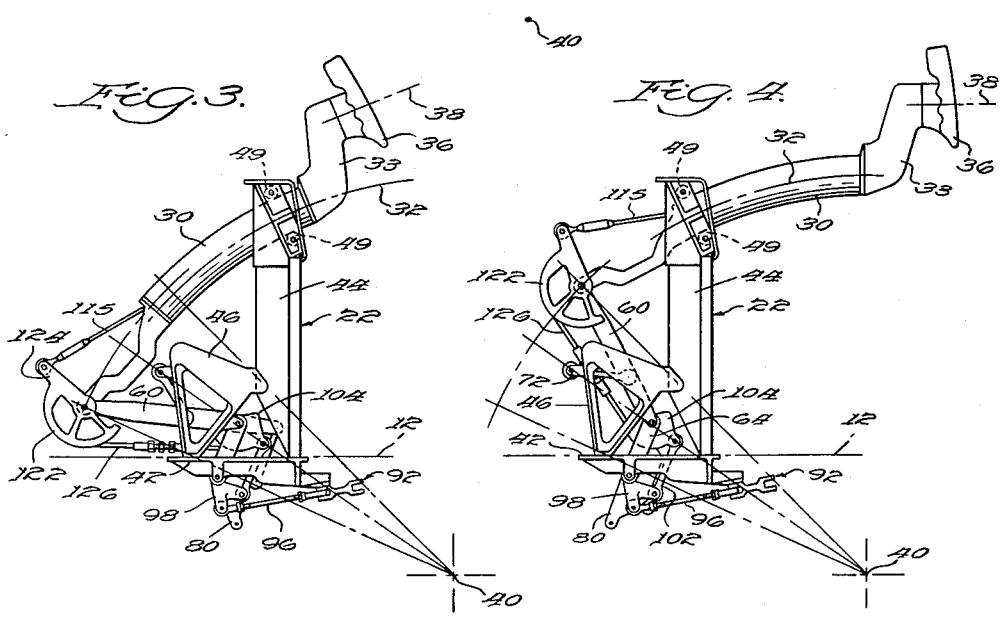
Inventor:
Carlton G. Peterson.
By Barkelew & Lewis

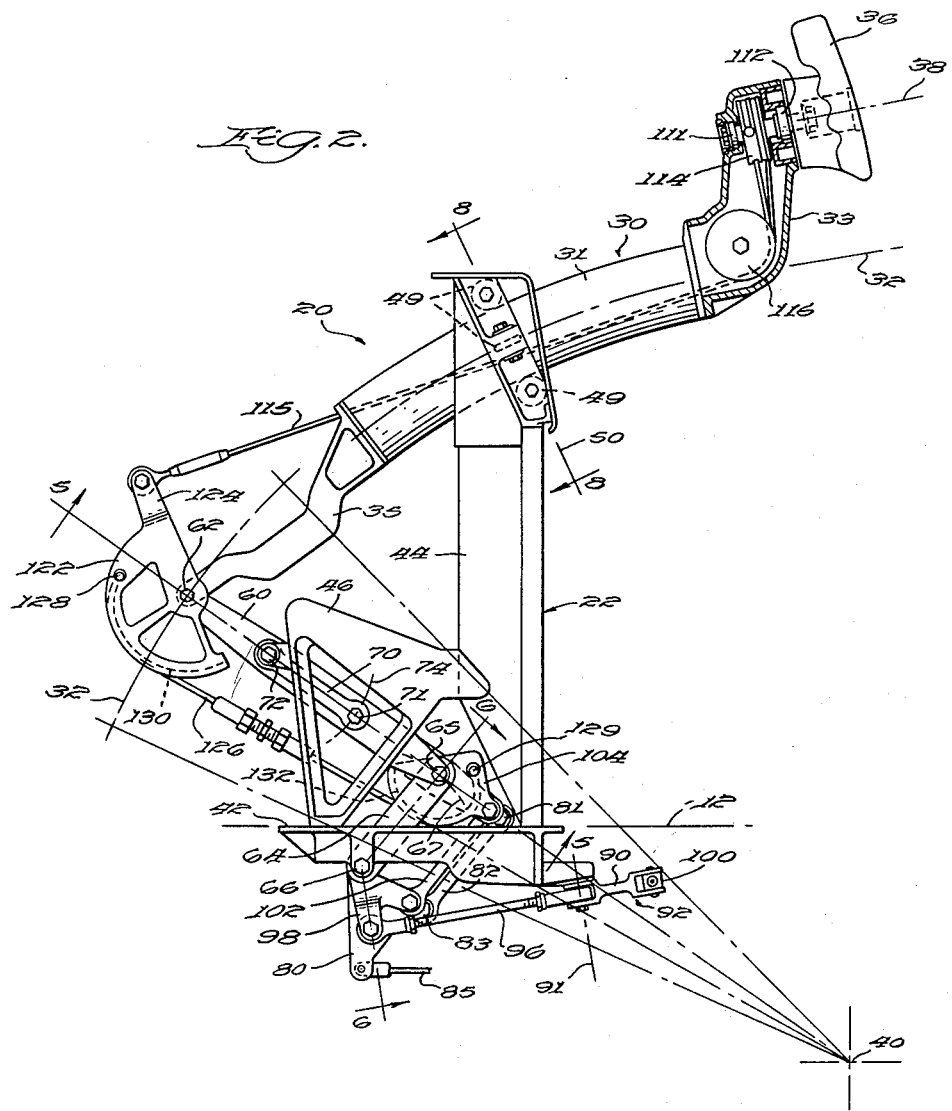

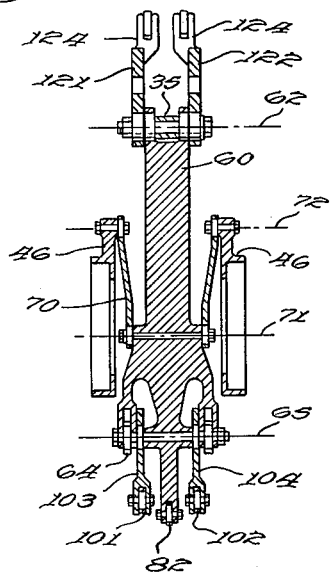
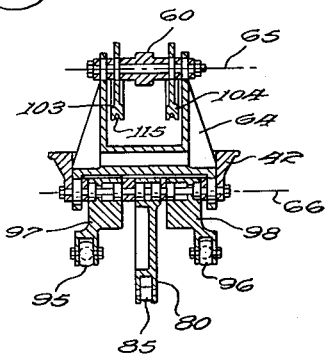
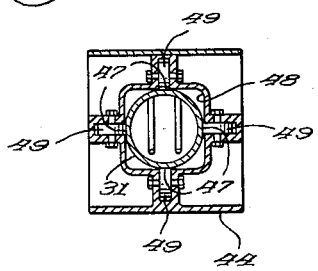
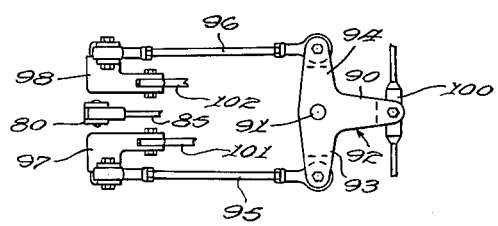

United States Patent Office 2,991,963
Patented July 11, 1961

2,991,963
AIRCRAFT CONTROL COLUMN
Carlton G. Peterson, West Los Angeles, Calif., assignor to Vard, Inc., Pasadena, Calif., a corporation of California
Filed July 3, 1958, Ser. No. 746,489
9 Claims. (Cl. 244—83)

This invention has to do with improved structure and arrangement for a control column through which the pilot controls certain aspects of the flight of an aircraft.

The invention relates more particularly to mechanism for supporting the control wheel by which the pilot controls the ailerons and the elevators of an aircraft.

In conventional practice the pilot's control wheel is mounted on a yoke of relatively heavy and cumbersome construction which is mounted in the aircraft for swinging movement about a transverse axis below the cockpit floor. Rotation of the control wheel with respect to the yoke is then utilized to control the ailerons, while swinging movement of the wheel and yoke as a unit about the transverse axis controls the aircraft elevators. Although that type of mounting for the pilot's control wheel is excessively heavy and cumbersome, the particular type of wheel movement that it provides is convenient and effective and has become conventional on most aircraft.

An important object of the present invention is to provide that convenient and acceptable type of wheel movement by means of a mechanism which is both lighter and far more compact. The invention further provides an entirely self-contained control column structure which includes all necessary moving parts for separating the various control movements of the wheel and which can be fixedly mounted as a unit in an aircraft. In preferred form of the invention, the frame of that self-contained unit may be mounted substantially wholly above the cockpit floor, in sharp contrast to the deep well and elaborate support structure that was necessary to permit swinging movement of the conventional yoke structure about the described transverse axis.

A further object of the invention is to provide mounting mechanism for a support member for the pilot's control wheel such that the support member is swingable about a virtual axis spaced from the actual structure of the mounting mechanism.

The invention further provides output mechanism in combination with such a wheel support by which entirely separate control movements can be derived from the swinging movement of the wheel support and from the wheel rotation.

A full understanding of the invention, and of its further objects and advantages, will be had from the following description of a preferred manner of carrying it out. Particulars of that description, and of the accompanying drawings which form a part of it, are intended only as illustration, and not as a limitation upon the scope of the invention, which is defined in the appended claims.

In the drawings:

FIG. 1 is a somewhat schematic side elevation illustrating typical location of the invention in an aircraft;

FIG. 2 is a somewhat schematic side elevation, with protecting housing removed, representing an illustrative embodiment of the invention in neutral position;

FIG. 3 is a side elevation corresponding to FIG. 2 at reduced scale and illustrating the mechanism in extreme dive position;

FIG. 4 is a side elevation corresponding to FIG. 3 and showing the mechanism in extreme climb position;

Figure 9:
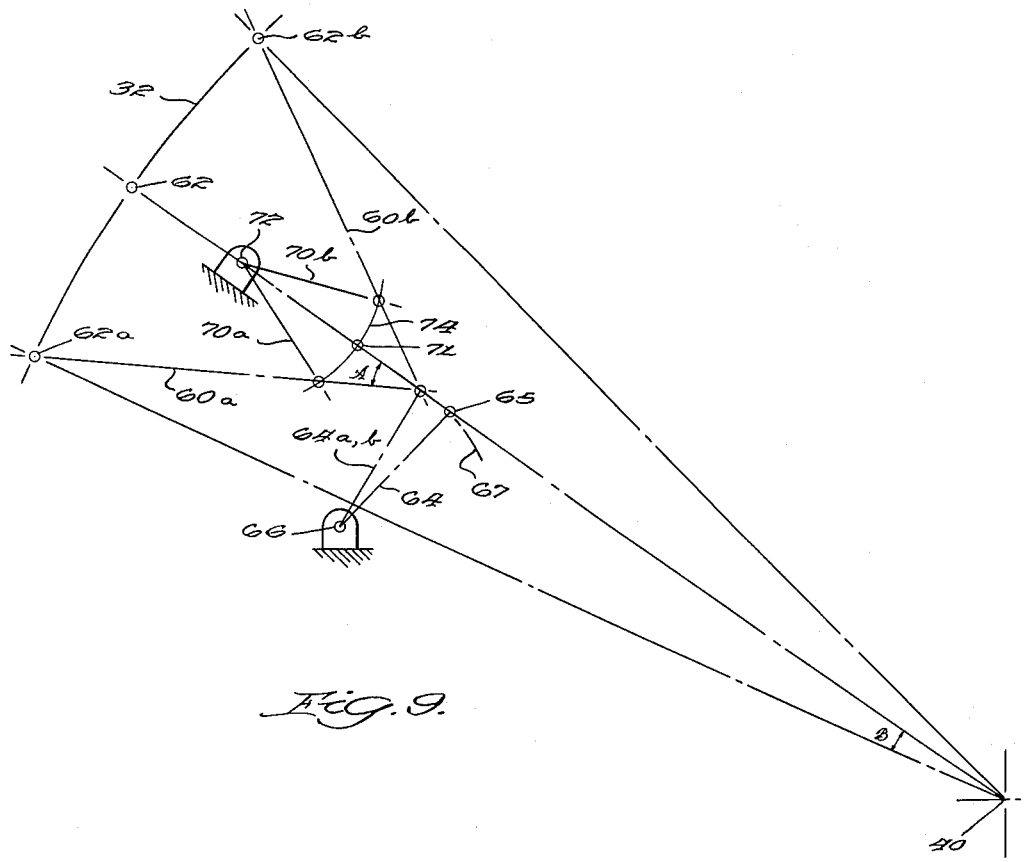

FIG. 5 is a section on line 5—5 of FIG. 2;
FIG. 6 is a section on line 6—6 of FIG. 2;
FIG. 7 is a partial bottom view in the aspect indicated by line 7—7 of FIG. 2;
FIG. 8 is a section on line 8—8 of FIG. 2; and
FIG. 9 is a schematic diagram representing certain kinematic relations of the mounting structure.

FIG. 1 represents schematically the normal manner of installing a pilot's control column in accordance with the present invention. The pilot's seat is indicated at 10, with the cockpit floor at 12, and the forward bulkhead of the cockpit at 14. A typical control column in accordance with the invention is indicated at 20, mounted directly forward of pilot's seat 10 and aft of bulkhead 14. Column 20 comprises a rigid column frame 22 enclosed by housing structure 24 which is preferably of light sheet metal. An elongated support member 30 is mounted in a novel manner with respect to column frame 22 in such a way that it is longitudinally movable along an arcuate path indicated schematically at 32.

Support 30 carries a control wheel 36, mounted for rotation about an axis 38 which is substantially parallel to the adjacent portion of path 32. Control wheel 36 is manually rotatable about axis 38 to deflect the ailerons of the aircraft and thereby control its roll about its longitudinal axis; and is movable bodily with support 30 along path 32 to control the elevators of the aircraft and thereby control its angle of climb or dive. In order to comply with normal aircraft practice, it is desirable that arcuate path 32 be substantially circular about a main axis, indicated at 40. Axis 40 is perpendicular to the paper as seen in FIGS. 1 to 4, and is thus transverse of the aircraft. Moreover, axis 40 is spaced appreciably below cockpit floor 12, and is substantially directly below control wheel 36 when the latter is in its normal, intermediate position. In some aircraft, particularly those for military use, the position of axis 40 with relation to the other parts of the control structure is defined in formal specifications. For other aircraft, position of the main axis may be somewhat more flexible, but is still preferably narrowly restricted in order to insure that the feel of control wheel 36 will be familiar and comfortable to the pilot.

In some prior art structures, support member 30 or its equivalent has been directly pivoted on axis 40 by means of one or more rigid radially extending struts. However, structures of that type are relatively heavy and bulky, requiring large openings in cockpit floor 12. They also occupy appreciable space below that floor, and even interfere with convenient support and adjustment of pilot's seat 10. The present invention avoids all of those difficulties by supporting member 30 on the relatively compact column frame 22 in such a way that it is movable bodily along a path 32 which is substantially circular about the main axis 40. An important feature of that support structure comprises particularly effective coupling means for obtaining independent output signals to the ailerons and to the elevators such that movement of support member 30 along its arcuate path affects only the elevator positions and rotation of control wheel 36 affects only the ailerons.

Control column 20 may include also means for supporting foot pedals adjacent the opposite side walls of housing 24 as indicated at 26 in FIG. 1. Pedals 26 are typically mounted for movement along substantially straight fore and aft paths, indicated schematically at 28, that movement being utilized to control the rudder of the aircraft. Each of the pedals 26 may also be rotatable about an axis transverse of the aircraft, indicated at 27, for controlling the brakes on one or more of the wheels of the aircraft landing gear. Since the present invention is concerned particularly with the aileron and elevator control system, mechanism typically associated with rudder and brake pedals 26, which may be of conventional construction, will be omitted from the present discussion for clarity of explanation.

Turning now particularly to FIG. 2, column frame 22, as illustratively shown, comprises the base plate 42, which is adapted to be mounted fixedly by any suitable means with relation to the frame structure of the aircraft substantially at the level of the cockpit floor 12 and forward of pilot's seat 10; the vertical column member 44, the lower end of which may be fixedly bolted to base 42 adjacent its after edge; and the diagonal brace member 46, which is of triangular shape with one side of the triangle bolted to the forward part of base 42 and to column 44.

Support member 30 comprises a circularly curved tubular portion 31, carrying at one end the wheel-supporting housing member 33 and at its other end the rigidly mounted structural member 35. Tubular portion 31 is curved to the radius of curvature selected for the arcuate path 32 along which support member 30 is to be guided. The outer surface of tubular portion 31 then serves as a convenient guide surface. As illustrated, the tubular portion of support 30 is freely received in an aperture 48 near the top of frame column member 44 and is guided therein by four rollers 49 which are pivotally mounted on the column frame with their peripheries extending into aperture 48 and engaging the support member. The rollers preferably engage faces 47 which are accurately milled on the support member and which may be flat as seen in section in FIG. 8. The remainder of the exterior surface of tubular portion 31 may be left unfinished and need not be highly accurate.

The guide rollers 49 permit free longitudinal movement of support member 30, while accurately guiding one point of that member along the desired arcuate path 32. The point of member 30 which is so guided is intermediate its length, and shifts along its length as the member moves along path 32. That guided point of support member 30 may be considered to be defined by the intersection with that member of the common plane of the pivot axes of rollers 49. That plane is indicated schematically at 50 in FIG. 2. A functionally equivalent structure, for some purposes, might comprise an arcuate surface mounted on frame column 44 and engaged by a follower structure fixed with respect to support member 30. However, the present structure permits the column frame to be far more compact, and is also more economical of weight since the extended substantially cylindrical surface of tube member 31 performs not only the described guiding function but also supplies necessary rigidity to the support member.

With one point of support member 30 guided on the desired arcuate path in the described manner, it is still necessary, in order to confine movement of the member to that path, to provide corresponding guidance of another point longitudinally spaced on member 30, and also to prevent rotation of member 30 about its longitudinal axis. Both of those functions are performed, in accordance with the present invention, by structure now to be described. That structure has the further outstanding advantage of facilitating the provision of satisfactory output mechanism.

An elongated arm 60 is pivoted with respect to support member 30 adjacent its forward end on the pivot axis 62. That axis is perpendicular to the plane of curved path 32, and hence is parallel to main axis 40. Arm 60 extends from support member 30 in the general direction of axis 40. In the position of the mechanism shown in FIG. 2, which will be considered its equilibrium position and preferably represents normal level flight of the aircraft, arm 60 lies in the common plane of main axis 40 and pivot axis 62, and thus may be considered to extend radially with respect to each of those axes. Although the length of arm 60, measured from pivot axis 62, is appreciably less than the distance to axis 40, being less than half that distance in the present embodiment, I have discovered that the arm can nevertheless be mounted on the column frame in such a way that movement of pivot axis 62 is confined to an arcuate path which coincides very closely with a circular arc about axis 40. In the present embodiment that guiding of arm 60 with respect to the column frame is accomplished by two links which are pivoted at one end to the arm on longitudinally spaced pivot axes and which are pivoted at their opposite ends on the column frame.

The transverse link 64 is pivoted with respect to arm 60 on the lower pivot axis 65, which is adjacent the end of arm 60 opposite to upper pivot axis 62 (see FIGS. 5 and 6). The other end of transverse link 64 is pivotally mounted on column frame 22 on the fixed axis 66. That axis is so located on base member 42 that link 64 extends at approximately 90° to the longitudinal axis of arm 60. In practice the link and arm preferably form an angle slightly less than 90° in normal position of the mechanism, as shown in FIG. 2. Transverse link 64 will be seen to confine the movement of lower pivot axis 65 to a path which is circular about fixed axis 66 and which, for small movements, is substantially radial with respect to main axis 40. That substantially radial path is indicated schematically at 67. Transverse link 64 is illustrative of a wide variety of guide structures for confining a point of arm 60, typically at lower pivot axis 65, to movement along a path that is substantially radial with respect to main axis 40. The present illustrative structure is particularly advantageous mechanically and also for reasons that will appear.

The longitudinal link 70 typically comprises two link elements which are spaced on opposite sides of arm 60, but act functionally as a single link. The link elements are pivoted at one end on arm 60 on the pivot axis 71, which is longitudinally spaced from lower pivot axis 65 in the direction of axis 62. The other ends of the link elements are pivotally mounted on column frame 22 on the fixed axis 72. In normal position of the mechanism, axis 72 lies in the plane defined by axes 62 and 71 and between them. Longitudinal link 70 has the effect of confining movement of intermediate pivot axis 71 to a circular arc about fixed axis 72. That arc is indicated at 74. Axis 71 on arm 60 is thus permitted to move transversely of the length of the arm, so that the arm may swing about lower pivot axis 65. As the amplitude of such movement increases, link 70 causes arm 60 to move also parallel to itself in a direction toward support member 30. That causes transverse link 64 to swing counter-clockwise, as seen in FIG. 2, about its fixed pivot 66. However, that movement is relatively small and maintains pivot axis 65 on the movement path 67, which is substantially radial with respect to main axis 40, as already pointed out. Because of that longitudinal movement of arm 60, upper pivot axis 62 on support member 30 moves along a path which is less sharply curved than it would be if axis 65 were fixed. That is, the radius of curvature of that path is longer than the distance from pivot axis 62 to axis 65.

By suitable dimensioning of the described links and suitable placement of the pivot axes, the radius of curvature along which pivot axis 62 is constrained to move may be made substantially equal to its radial distance from main axis 40. As arm 60 swings in either direction from its normal position, pivot axis 62 then moves along a path 32 which is substantially circular about axis 40. In actual practice that path may approximate such a circle extremely closely up to angular deflections of arm 60 of 10 to 15°, and the departure from a strictly circular path is still satisfactorily small at even larger angles.

In the present illustrative embodiment, the four axes 65, 71, 72, and 62, are located successively along the length of arm 60 in normal position of the mechanism, and are approximately equidistant from each other. Whereas that latter relation has been found satisfactory for mechanism embodying the present particular proportions, especially the illustrated ratio of the length of arm 60 to the radial distance of pivot axis 62 from main axis 40, it is desirable to determine the optimum dimensional relationships to meet the requirements of any particular structure.

Since all of the axes are maintained in mutually parallel relation by the link structures and by arm 60 itself, axis 62 is prevented from rotating about the longitudinal axis of support member 30, and such rotation of that member is also prevented. With two longitudinally spaced points of support member 30 constrained to move along the desired path 32, the entire member is caused to move along that path.

An important advantage of the type of mounting for support member 30 which has just been described, is that it is well adapted for providing convenient and effective output means for the primary control movements. An illustrative form of such output means will now be described. As already indicated, the bodily movement of control wheel 36 and support 30 along arcuate path 32 is utilized to control the aircraft elevators. A measure of that movement can conveniently be derived from the swinging movement of arm 60 about its lower pivot axis 65. However, it is desirable to separate that swinging movement of arm 60 from the relatively small longitudinal movement of the arm which accompanies movement of axis 65 along the circular path 67. In accordance with one aspect of the present invention, such separation is accomplished by a parallelogram linkage of which link 64 constitutes one member.

In the present embodiment an elevator control output lever 80 is pivotally mounted on the fixed axis 66 coaxial with link 64, and is driven from arm 60 by the elevator link 82. Elevator link 82 is pivotally mounted on arm 60 on the pivot axis 81 which is spaced longitudinally of the arm from axis 65; and is pivotally mounted at its other end on output lever 80 on the axis 83. Axis 83 is spaced from fixed axis 66 in the same direction and by the same amount as the spacing of axis 81 from axis 65 on arm 60. Accordingly, link 82 is equal in length to the support link 64, already described. The resulting parallelogram structure permits free translational movement of arm 60 along the path 67 to which it is constrained by link 64 without causing any resulting rotational movement of output lever 80 about its support axis 66. However, any swinging movement of arm 60 about axis 65 causes a corresponding swinging movement of output lever 80. That movement may conveniently be transmitted to the aircraft elevators to control their positions, as via a conventional linkage mechanism indicated schematically at 85. That movement is completely independent of the rotational position of manual control wheel 36, since that wheel rotation does not affect the swinging movement of arm 60 from which the elevator control is derived.

For effective control of the aircraft ailerons in accordance with the rotation of control wheel 36, it is necessary to separate that rotation from the arcuate movement of support member 30. That separation is complicated by the fact that the virtual axis of rotation 40 of support member 30 is widely spaced from the present mechanism and is not available as a pivot axis for any output structure. Nevertheless, the invention provides fully effective separation of the aileron control movement by mechanism which is reliable, economical, and remarkably light in weight by comparison with previously available structures.

The aileron output control movement is delivered at output lever 90, which is pivotally mounted on frame 22 on a substantially vertical axis 91, and forms part of a cross-over bell-crank structure 92 (FIG. 7). The oppositely extending arms 93 and 94 of cross-over bell-crank 92 are driven by the respective coupling rods 95 and 96 from the bell-crank levers 97 and 98. The latter two levers are pivotally mounted on frame plate 42 on the fixed horizontal pivot axis 66, as shown, for example, in FIG. 6. The pivotal connections of coupling rods 95 and 96 to the levers at their ends are of a type that accommodates the universal movement that results from the fact that levers 97 and 98 are mounted on a horizontal axis while cross-over lever 92 is mounted on a generally vertical axis. That universal movement is kept small, and the second-order effect that it produces on the lever rotation is made negligible in practice, by making the rods 95 and 96 long compared to the lever arms at which they act.

Bell-crank levers 97 and 98 are driven by respective aileron links 101 and 102 from the respective lower sector members 103 and 104. The latter are pivotally mounted on arm 60 on the pivot axis 65, already described (see FIG. 5). Aileron links 101 and 102 are equal in length to support link 64, and their ends are pivoted at equal radial distances from axes 65 and 66 to form linkage parallelograms with link 64. Hence, translational movement of sector members 103 and 104 with arm 60 along the movement path 67 does not cause any rotation of bell-cranks 97 and 98 about their fixed mounting axis 66. On the other hand, any rotation of sector members 103 and 104 in opposite directions about axis 65 is transmitted via the described aileron links, bell-cranks, and coupling rods to cross-over bell-crank 92, causing rotation thereof about its support axis 91. That movement is transmitted to the ailerons via suitable coupling structure of conventional type, indicated at 100. Lower sector members 103 and 104 are oppositely driven in response to rotation of control wheel 36.

Manual control wheel 36 is journaled on housing member 33 by suitable bearings indicated at 111 and 112, and carries a pulley 114. A flexible cable 115 is wound on pulley 114 and secured thereto in known manner to prevent slippage. The two ends of the cable pass over respective guide pulleys 116 and pass in spaced relation longitudinally through the hollow curved portion 31 of support member 30. In the present illustrative embodiment, the ends of cable 115 terminate at respective upper sector members 121 and 122, which are pivotally mounted on the pivot axis 62, already described, and to which the cable ends are connected by means of upwardly extending radial arms 124. Accordingly, rotation of control wheel 36 in either direction positively swings one of the upper sector members about axis 62 relative to support member 30 in a clock-wise direction as seen in FIG. 2, and permits opposite swinging movement of the other sector member of the pair.

If that opposite swinging movement of the two sector members 121 and 122 is considered relative to support member 30, it is not affected by bodily movement of the support member, sector members, and control wheel 36 as a unit along path 32. However, due to the arcuate nature of path 32, such movement involves rotation of both sector members with respect to the fixed structure of the aircraft. In accordance with an important aspect of the present invention, that rotation of the upper two sector members with support 30 is compensated by employing a suitable type of coupling mechanism between each of the upper sector members 121 and 122 and the corresponding lower sector member 103 or 104, already described. That coupling mechanism, which may utilize cables, gears, levers or any other suitable type of drive connection, is such that the ratio of corresponding angular movements of the upper and lower sector arms with respect to arm 60 is substantially equal to the ratio $(A-B)/A$, where A is the angular deflection of arm 60 that corresponds to movement of support member 30 through a given angle B about axis 40. Typical angles A and B are indicated in FIG. 9. With the described support structure, the ratio $A/B$ is substantially equal to the ratio of the radial distance of upper pivot axis 62 from axis 40 to its distance from lower pivot axis 65.

In the present illustrative form of the invention, each of the coupling mechanisms just described comprises a cable 126 and circularly curved pulley sectors on the respective sector members, over which the cable leads to suitable fastening fixtures indicated at 128 and 129. The pulley surface of upper sector 122 is indicated at 130, that of lower sector 104 at 132. In accordance with the present aspect of the invention, the ratio of the radii of pulley surfaces 130 and 132 is substantially equal to the ratio of the respective radial distances of upper pivot axis 62 and lower pivot axis 65 from main axis 40. It may be noted that when that condition is met and when axes 62 and 65 lie in a common plane with main axis 40, as when the mechanism is in the normal position represented in FIG. 2, each of the cables 126 extends radially with respect to main axis 40. Cables 115 and 126 are preferably adjustable, as by turnbuckles, and are set up with sufficient tension to provide, with the structure already described, an effectively positive linkage between wheel 36 and cross-over bell-crank 92.

With the described aileron coupling structure, longitudinal movement of support member 30 along path 32, as for control of the aircraft elevators, produces substantially zero rotation of lower sector members 103 and 104 about their axis 65 with respect to the fixed structure of the aircraft. Hence elevator manipulation, even to the extreme limits of its range, as indicated in FIGS. 3 and 4, causes no measurable deflection of the aileron output lever 90. The compensating action of the described aileron linkage is not absolutely precise in a theoretical sense, due to such factors as the slight departure of the movement path of axis 62 from a strictly circular arc about main axis 40. However, the primary effect of that slight approximation upon the aileron output linkage comprises a progressive change in the tension of cables 115 and 126, that tension typically increasing toward the limits of movement represented in FIGS. 3 and 4. Such slight increase in cable tension does not interfere with reliable and effective aileron control, and any reactive force that it produces longitudinally of support member 30 may readily be compensated, if desired, for example by suitably designed spring mechanism.

Under some conditions it may be convenient to connect cable 115, or its equivalent, to upper sector members 121 and 122 at a radius from axis 62 equal to that of pulley surfaces 130. Radial arms 124 may then be omitted. Moreover, cables 126 may then comprise extensions of cable 115, the upper sector members acting as simple pulleys. The presently described structure, however, has the advantage that, for given linear travel of cable 115, the required radii of pulley sectors 130 and 132 is appreciably reduced, saving both space and weight.

As already pointed out, the described type of movement of arm 60 is useful for providing output mechanism for separately coupling the control wheel rotation to the ailerons and the arcuate movement of support 30 to the elevators. That function of arm 60 may be obtained, if desired, apart from the described function of supporting wheel support 30 and guiding its pivot axis 62 along arcuate path 32. For example, the support and guide means for support member 30 may comprise two sets of guide rollers mounted on frame 22 and engaging tubular portion 31 of the support member at two longitudinally spaced points thereof, each of those sets of rollers being typically like the rollers 49, already described. Such support structure for member 30 confines upper pivot axis 71 to circular movement about main axis 40. Longitudinal link 70 may therefore be omitted without appreciably altering either the described movement of arm 60 or the described action of the respective coupling linkages for driving elevator output lever 80 and aileron output lever 90.

It will be understood that many further changes can be made in the particular structures that have been described without departing from the proper scope of the invention, which is defined in the appended claims.

I claim:

1. In a pilot's control column for an aircraft, the combination of a column frame adapted to be fixedly mounted in an aircraft forward of the pilot's seat, a wheel support member, means engaging the support member and confining a point thereof to movement along an arcuate path that is substantially circular about a main axis transverse of the aircraft, an arm pivoted at one end on the support member on a pivot axis spaced from said point, said arm normally extending from the pivot axis substantially radially toward the main axis, first guide means engaging the arm at a point adjacent its other end and acting to confine that point to movement along a path that is substantially radial with respect to the main axis, second guide means acting to cause movement of the guided point of the arm along its movement path away from the main axis in response to swinging of the arm away from its normal position, whereby said pivot axis is confined to an arcuate path that is substantially circular about the main axis, and a manual control wheel rotatably mounted on the support member.

2. In a pilot's control column for an aircraft, the combination of a column frame adapted to be fixedly mounted in an aircraft forward of the pilot's seat, a wheel support member, means engaging the support member and confining a point thereof to movement along an arcuate path that is substantially circular about a main axis transverse of the aircraft, an arm pivoted at one end on the support member on a pivot axis spaced from said point, a first link having one end pivoted on the frame and the other end pivoted on the arm on a support axis longitudinally spaced from the pivot axis, a second link having one end pivoted on the frame and the other end pivoted on the arm at a point longitudinally spaced from the pivot axis and from the support axis, the arm normally extending from the pivot axis substantially radially toward the main axis, and the first and second links normally being substantially perpendicular and parallel, respectively, to the length of the arm, and a manual control wheel rotatably mounted on the support member.

3. In a pilot's control column for an aircraft, the combination defined in claim 2, and including also respective aileron and elevator output member pivotally mounted on the frame, first coupling means positively driving the elevator output member in response to swinging movement of the arm about the support axis, and second coupling means positively driving the aileron output member in response to rotation of the control wheel and substantially independently of the movement of the support member.

4. In a pilot's control column for an aircraft, the combination defined in claim 3, and in which said second coupling means comprises a first coupling member mounted for pivotal movement about said pivot axis, a second coupling member mounted for pivotal movement about said support axis, first driving means interconnecting the control wheel and the first coupling member, second driving means interconnecting the first and second coupling members, and third driving means extending generally parallel to said first link and interconnecting the second coupling member and the aileron output member.

5. In a pilot's control column for an aircraft, the combination defined in claim 4, and in which said first and second coupling members include respective pulley surfaces, said second driving means comprising tensioned flexible cable means engaging said pulley surfaces, the ratio of the radii of the pulley surfaces of the first and second coupling members being approximately equal to the ratio of the radial distances from said main axis to the pivot axis and to the support axis, respectively.

6. In a pilot's control column for an aircraft, the combination defined in claim 3, and in which said second coupling means comprises a first pair of coupling members mounted for pivotal movement about said axis, a second pair of coupling members mounted for pivotal movement about said support axis, tensioned cable means interconnecting the control wheel and the first pair of coupling members to drive the latter in respective opposite directions, drive means interconnecting the coupling members of one pair with respective coupling members of the other pair, and link means connecting the coupling members of the second pair with said aileron output member to drive the the latter in response to opposite rotation of the respective coupling members of the second pair.

7. In a pilot's control column for an aircraft, the combination defined in claim 6, and in which said drive means comprises respective linkage means which interconnect points of the corresponding coupling members of the first and second pair, said points being offset from the pivot axis and from the support axis, respectively, by distances whose ratio is substantially equal to the ratio of the radial distances of those axes from the main axis.

8. In a pilot's column for an aircraft, the combination of a column frame adapted to be fixedly mounted in an aircraft forward of the pilot's seat, a support member, a control wheel rotatably mounted on the support member, structure mounting the support member on the column frame for movement along a predetermined arcuate path that is substantially circular about a main axis transverse of the aircraft, an output member pivotally mounted on the column frame, and coupling means positively driving the output member in response to rotation of the control wheel and substantially independently of said arcuate movement of the support member, said coupling means comprising an arm pivoted at one end on the support member on a pivot axis parallel to said main axis and spaced therefrom, the length of the arm being less than the distance from the pivot axis to the main axis, guide means engaging the arm adjacent a point spaced from the pivot axis and acting to confine said point to movement along a path that is substantially radial with respect to the main axis, a first coupling member mounted for pivotal movement about said axis, a second coupling member mounted for pivotal movement about a coupling axis parallel to the pivot axis and substantially coinciding with said guided point of the arm, first driving means interconnecting the control wheel and the first coupling member, second driving means interconnecting the first and second coupling members, and third driving means interconnecting the second coupling member and the output member.

9. In a pilot's control column for an aircraft, the combination defined in claim 8, and in which said second driving means drives the first and second coupling members relative to the arm at respective angular speeds whose ratio is substantially equal to the ratio of the radial distances of the pivot axis of the coupling axis from said main axis.

References Cited in the file of this patent

UNITED STATES PATENTS

| | | |
|---|---|---|
| 1,415,176 | Hughes | May 9, 1922 |
| 2,461,194 | Beetle | Feb. 8, 1949 |
| 2,539,753 | Peterson | Jan. 20, 1951 |

UNITED STATES PATENT OFFICE

CERTIFICATE OF CORRECTION

Patent No. 2,991,963                                    July 11, 1961

Carlton G. Peterson

It is hereby certified that error appears in the above numbered patent requiring correction and that the said Letters Patent should read as corrected below.

Column 8, line 50, for "member" read -- members --; column 9, line 6, and column 10, line 12, for "said axis", each occurrence, read -- said pivot axis --; same column 10, line 26, after "axis", first occurrence, insert -- and --.

Signed and sealed this 5th day of December 1961.

(SEAL)
Attest:

ERNEST W. SWIDER                                  DAVID L. LADD
Attesting Officer                                     Commissioner of Patents

USCOMM-DC